United States Patent
Grabmaier et al.

(10) Patent No.: US 10,274,722 B2
(45) Date of Patent: Apr. 30, 2019

(54) MECHANICAL COMPONENT AND METHOD FOR ADJUSTING AN ADJUSTABLE PART AT LEAST ABOUT ONE AXIS OF ROTATION

(71) Applicant: Robert Bosch GmbH, Stuttgart (DE)

(72) Inventors: Florian Grabmaier, Tuebingen (DE); Philipp Troebner, Boeblingen (DE); Christian Ohl, Pfullingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/646,217

(22) Filed: Jul. 11, 2017

(65) Prior Publication Data

US 2018/0017782 A1 Jan. 18, 2018

(30) Foreign Application Priority Data

Jul. 13, 2016 (DE) .................. 10 2016 212 703

(51) Int. Cl.

| | |
|---|---|
| *G02B 26/08* | (2006.01) |
| *H01F 7/02* | (2006.01) |
| *H01F 7/122* | (2006.01) |
| *H01F 7/14* | (2006.01) |

(52) U.S. Cl.
CPC ....... *G02B 26/0833* (2013.01); *G02B 26/085* (2013.01); *H01F 7/0242* (2013.01); *H01F 7/122* (2013.01); *H01F 7/14* (2013.01)

(58) Field of Classification Search
CPC .. G02B 26/0833; G02B 26/085; G02B 26/08; G02B 26/10; G02B 26/101; G02B 26/105; H01F 7/0242; H01F 7/122; H01F 7/14; H01F 41/00; H01F 7/02; B81B 3/0018
USPC ....................................... 359/221.2
See application file for complete search history.

(56) References Cited

U.S. PATENT DOCUMENTS

| | | |
|---|---|---|
| 6,965,177 B2 | 11/2005 | Turner et al. |
| 2004/0105139 A1* | 6/2004 | Hirose .................. B81B 3/0018 359/199.3 |
| 2014/0159827 A1* | 6/2014 | Hofmann .............. B81B 3/0018 331/154 |

* cited by examiner

*Primary Examiner* — Euncha P Cherry
(74) *Attorney, Agent, or Firm* — Norton Rose Fulbright US LLP; Gerard Messina

(57) ABSTRACT

A mechanical component having an adjustable part and a magnetic actuator device having at least one first permanent-magnetic element, which is able to be set into a first adjustment motion, whereby the adjustable part is able to be set into a first co-adjustment motion about a first axis of rotation, and wherein the magnetic actuator device includes at least one first external permanent magnet, which induces a first magnetic field and is able to be set into a first excitation motion such that the at least one first permanent-magnetic element is able to be set into the first adjustment motion. A production method for a mechanical component and a method for adjusting an adjustable part at least about a first axis of rotation in relation to its support, are also described.

12 Claims, 3 Drawing Sheets

MECHANICAL COMPONENT AND METHOD FOR ADJUSTING AN ADJUSTABLE PART AT LEAST ABOUT ONE AXIS OF ROTATION

CROSS REFERENCE

The present application claims the benefit under 35 U.S.C. § 119 of German Patent Application No. DE 102016212703.9 filed on Jul. 13, 2016, which is expressly incorporated herein by reference in its entirety.

FIELD

The present invention relates to a mechanical component and to a production method for a mechanical component. In addition, the present invention relates to a method for adjusting an adjustable part at least about a first axis of rotation in relation to its support.

BACKGROUND INFORMATION

U.S. Pat. No. 6,965,177 B2 describes micro-mirror devices, which include an individual mirror plate that can be adjusted about an axis of rotation with respect to an associated support. A magnetic actuator device having at least one permanent-magnetic element directly or indirectly connected to the mirror plate is used to adjust the mirror plate. A magnetic field varying over time can be induced by energizing at least one coil of a magnet yoke of the magnetic actuator device by an alternating current signal, in such a way that the at least one permanent-magnetic element together with the associated mirror plate is adjusted about the axis of rotation.

SUMMARY

The present invention provides a mechanical component, a production method for a mechanical component, and a method for adjusting an adjustable part about at least a first axis of rotation in relation to its support.

The present invention provides examples for adjusting an adjustable part (such as a micro-mirror or a macro-mirror) about at least one axis of rotation with the aid of a magnetic actuator device; in this case, it is not necessary to fit the magnetic actuator device with a magnet yoke. Conventional disadvantages of magnet yokes, such as their required space, working steps for placing the adjustable part in the magnet yoke, or inhomogeneities of a magnetic field induced with the aid of a magnet yoke, are therefore also no longer a problem. The present invention consequently also provides more cost-effective options for adjusting the adjustable part about at least the one axis of rotation, and as an option, a minimization or an increase in size of the adjustable part is able to be realized in an uncomplicated manner.

The present invention is particularly suitable for the resonant adjustment of the adjustable part about the at least one axis of rotation. In contrast to an electrostatic actuator, the magnetic actuator device requires no routing of circuit traces across at least one spring that is used for suspending the adjustable part on its allocated support. Thus, the adjustable part may be adjustably disposed on its support in an uncomplicated manner in such a way that a natural frequency of a harmonic oscillation of the adjustable part about the at least one axis of rotation is able to be reliably set to a desired value. At the same time, the magnetic actuator device may be economically designed to adjust the at least one external permanent magnet at the individual natural frequency into its excitation motion. A contact between the at least one external permanent magnet and the magnetic actuator device has no effect on the desired natural frequency of the harmonic oscillation of the adjustable part about the at least one axis of rotation.

In an advantageous specific embodiment of the mechanical component, the magnetic actuator device includes at least one second permanent-magnetic element and at least one second external permanent magnet. In addition, it is designed to set the at least one second external permanent magnet into a second excitation motion in such a way that the at least one second permanent-magnetic element is able to be set into a second adjustment motion with the aid of a second magnetic field, which is induced by the at least one second external permanent magnet and which varies over time on account of the individual second excitation motion of the at least one second external permanent magnet. The adjustable part is directly or indirectly connected to the at least one second permanent-magnetic element such that the adjustable part is able to be set into a second co-adjustment motion about a second axis of rotation that is aligned at an incline to the first axis of rotation, with the aid of the at least one second permanent-magnetic element set into the respective second adjustment motion. As a result, the present invention may also be utilized for realizing advantageous mechanical components whose adjustable part is adjustable about two axes of rotation that are situated at an incline to each other.

Preferably, the adjustable part is suspended on the support at least by at least one inner spring and at least one outer spring such that the adjustable part is adjustable in relation to the support about the first axis of rotation under deformation of at least the at least one inner spring, and that the adjustable part is simultaneously adjustable about the second axis of rotation under deformation of at least the at least one outer spring. As a result, an advantageous spring system at least made up of the at least one inner spring and the at least one outer spring may be used for the adjustable connection/suspension of the adjustable part on the support. It is expressly pointed out that in this case a natural frequency of the harmonic oscillation of the adjustable part about the first/second axis of rotation is easily able to be set to a desired value with the aid of the at least one inner/outer spring which is deformed in the process.

In particular, the magnetic actuator device may be designed to resonantly adjust the adjustable part about the first axis of rotation in relation to the support under deformation of at least the at least one inner spring, and at the same time, to adjust the adjustable part in a quasi-static manner about the second axis of rotation under deformation of at least the at least one outer spring. This specific embodiment of the mechanical component is able to be used in many ways.

Application options, for example, are projectors (such as μ-projectors) or scanners (such as laser line scanners). Above all, the corresponding mechanical component, in the form of a 2D-laser line scanner or a 3D-laser line scanner, may be used not only for the space-saving spreading-out of beam sources, but also for a gesture control in space.

For example, the magnetic actuator device may include at least one piezo, with the aid of which the at least one first external permanent magnet or the at least one second external permanent magnet is able to be set into the respective first or second excitation motion aligned along its respective predefined adjustment axis. As an alternative or in addition, the magnetic actuator device may also include at least one motor by which the at least one first external permanent magnet and/or the at least one second external permanent magnet is/are able to be set into the respective first or second excitation motion aligned along the respective predefined adjustment axis or rotating about the respective predefined axis of rotation. Thus, cost-effective components that require little space may be used for setting the at least one first external permanent magnet into its first excitation motion and/or for setting the at least one second external permanent magnet into its second excitation motion.

In an advantageous specific embodiment, the mechanical component is a micromechanical component and/or a micromirror. The present invention may thus be utilized for minimizing mechanical components such as mirror devices, in particular.

Preferably, the mechanical component is a macromechanical component and/or a macro-mirror. This makes it possible to exploit the fact that the present invention allows for the application of relatively high forces for adjusting the adjustable part about at least the first axis of rotation, without requiring a line that would adversely affect the adjustability of the adjustable part for this purpose.

The afore-described advantages may also be attained when carrying out a corresponding production method for a mechanical component. It should be pointed out that the production method according to the afore-described specific embodiments of the mechanical component may be developed further.

In addition, an execution of a corresponding method for adjusting an adjustable part about at least a first axis of rotation in relation to its support also provides the advantages described earlier already. The method for adjusting an adjustable part at least about a first axis of rotation in relation to its support is also able to be further developed according to the afore-described specific embodiments.

BRIEF DESCRIPTION OF THE DRAWINGS

Additional features and advantages of the present invention are described below with the aid of the figures.

DETAILED DESCRIPTION OF EXAMPLE EMBODIMENTS

Figure 1:
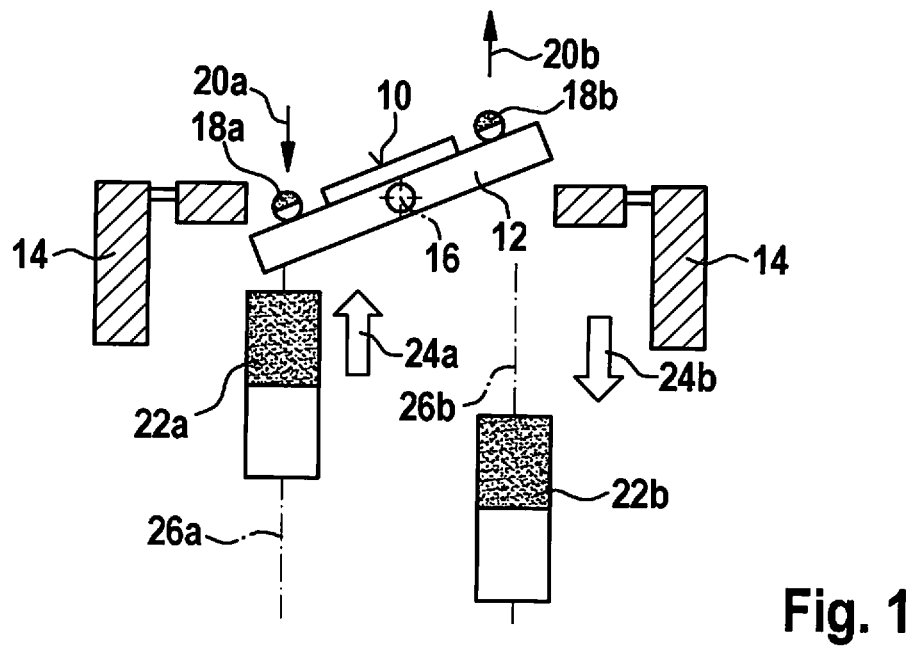
FIG. 1 shows a schematic illustration of a first specific embodiment of the mechanical component.

FIG. 1 shows a schematic illustration of a first specific embodiment of the mechanical component.

Merely by way of example, the mechanical component schematically illustrated in FIG. 1 is developed as a mirror device having an adjustable part 12 featuring a reflective surface 10. It is pointed out that the options for developing the mechanical component are not limited to mirror devices.

Adjustable part 12 is disposed on a support 14 (only partially shown) in such a way that adjustable part 12 is able to be adjusted about at least one axis of rotation 16 in relation to support 14. Toward that end, the mechanical component includes a magnetic actuator device having at least one permanent-magnetic element 18a and 18b. The at least one permanent-magnetic element 18a and 18b may be set into a respective adjustment motion 20a and 20b with the aid of a magnetic field that is induced by the magnetic actuator device and varies over time. In addition, the at least one permanent-magnetic element 18a and 18b is directly or indirectly connected to adjustable part 12 such that adjustable part 12 is able to be set into a co-adjustment motion about axis of rotation 16 with the aid of the at least one permanent-magnetic element 18a and 18b set into respective adjustment motion 20a and 20b. Options for the advantageous linkage/connection of adjustable part 12 to the at least one permanent-magnetic element 18a and 18b will be discussed later in the text.

The magnetic actuator device also includes at least one external permanent magnet 22a and 22b, which induces the magnetic field (for setting the at least one permanent-magnetic element 18a and 18b into its respective adjustment motion 20a and 20b). In addition, the magnetic actuator device is designed to set the at least one external permanent magnet 22a and 22b into a respective excitation motion 24a and 24b in such a way that the at least one permanent-magnetic element 18a and 18b is able to be set into respective adjustment motion 20a and 20b with the aid of the magnetic field that varies over time on account of excitation motion 24a and 24b of the at least one external permanent magnet 22a and 22b. It is therefore not necessary to provide the mechanical component with a magnet yoke.

Preferably, the mechanical component has an even number of permanent-magnetic elements 18a and 18b; a first half of the permanent-magnetic elements 18a is situated on a first side of axis of rotation 16, and a second half of permanent-magnetic elements 18b is situated on a second side of axis of rotation 16. (A number of permanent-magnetic elements 18a on the first side of axis of rotation 16 is thus equal to a number of permanent-magnetic elements 18b on the second side of axis of rotation 16.) A first polarity of the first half of permanent-magnetic elements 18a and a second polarity of the second half of permanent-magnetic elements 18b preferably point in a same direction. In other words, this may also be understood as a symmetrical distribution of permanent-magnetic elements 18a and 18b on both sides of axis of rotation 16.

An even number of external permanent magnets 22a and 22b is also preferred for the mechanical component. A first half of external permanent magnets 22a may be allocated to the first half of permanent-magnetic elements 18a (number of external permanent magnets 22a and 22b divided by 2), while a second half of external permanent magnets 22b (number of external permanent magnets 22a and 22b divided by 2) is allocated to the second half of permanent-magnetic elements 18b. In particular, a respective external permanent magnet 22a and 22b may be allocated to the first half of permanent-magnetic elements 18a and to the second half of permanent-magnetic elements 18b. (Merely by way of example, exactly two permanent-magnetic elements 18a and 18b have been allocated a respective external permanent magnet 22a and 22b in the specific embodiment of FIG. 1).

In the specific embodiment of FIG. 1, the first half of external permanent magnets 22a and the second half of external permanent magnets 22b are adjustable into their respective excitation motion 24a or 24b along a respective predefined adjustment axis 26a or 26b. Adjustment axis 26a and 26b of excitation motions 24a or 24b of all external permanent magnets 22b are preferably aligned in parallel with respect to one another. Put another way, external permanent magnets 22a and 22b are moved laterally in their respective excitation motions 24a or 24b.

In particular, external permanent magnets 22a and 22b are able to be set/are set to oscillate at an identical frequency along the respective predefined adjustment axis 26a and 26b with the aid of the magnetic actuator device; in the process, the first half of external permanent magnets 22a oscillates in phase opposition/phase-shifted by 180° in relation to the second half of external permanent magnets 22b. This makes it possible for the first half of external permanent magnets 22a and the second half of external permanent magnets 22b to attract or repel the respectively allocated half of permanent-magnetic elements 18a or 18b in phase opposition/phase-shifted by 180°. While the first half of external permanent magnets 22a repels the first half of permanent-magnetic elements 18a, the second half of external permanent magnets 22b attracts the second half of permanent-magnetic elements 18b, thereby triggering a partial motion of permanent-magnetic elements 18a and 18b about axis of rotation 16 into a first direction of rotation. Accordingly, the first half of external permanent magnets 22a attracts the first half of permanent-magnetic elements 18a when the second half of external permanent magnets 22b repels the second half of permanent-magnetic elements 18b; this induces a further partial motion of permanent-magnetic elements 18a and 18b about axis of rotation 16 into a second direction of rotation, which is directed counter to the first direction of rotation. The alternately executed partial motions into the two directions of rotation result in adjustment motions 20a and 20b of permanent-magnetic elements 18a and 18b, respectively.

For example, the magnetic actuator device may include at least one piezo by which external permanent magnets 22a and 22b may be set or are set into respective excitation motion 24a and 24b aligned along predefined adjustment axis 26a and 26b in each case. In the same way the magnetic actuator device may include at least one motor; via its operation, external permanent magnets 22a and 22b are able to be set or are set into the respective excitation motion 24a and 24b aligned along predefined adjustment axis 26a and 26b, respectively. As can be gathered from FIG. 1, a contact between the magnetic actuator device and external permanent magnets 22a and 22b has no effect on an adjustability of adjustable part 12 about axis of rotation 16 or on a natural frequency of a harmonic oscillation of adjustable part 12 about axis of rotation 16. It is therefore also possible to use cost-effective components of the magnetic actuator device that contact external permanent magnets 22a and 22b for the purpose of inducing the excitation motion 24a or 24b.

It should also be pointed out that the mounting of external permanent magnets 22a and 22b on a side of adjustable part 12 that points away from permanent-magnetic elements 18a and 18b, as shown in FIG. 1, should be understood as merely an example. Alternatively or additionally, external permanent magnets 22a and 22b may also be situated on a side of adjustable part 12 that is fitted with permanent-magnetic elements 18a and 18b.

Figure 2A:
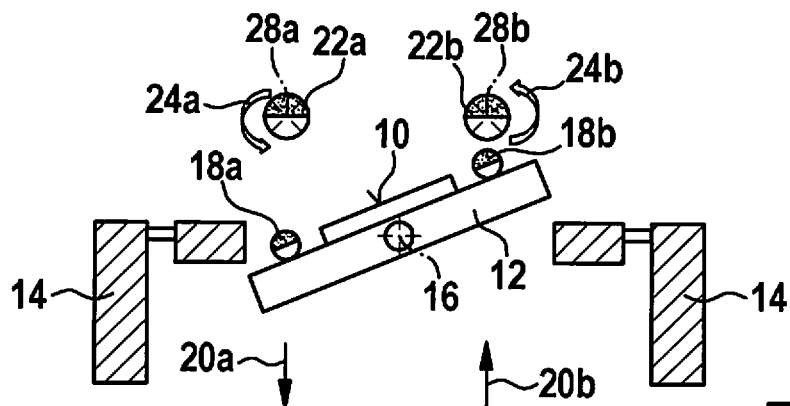
FIGS. 2a and 2b show a second specific embodiment and a third specific embodiment of the mechanical component.
Figure 2B:
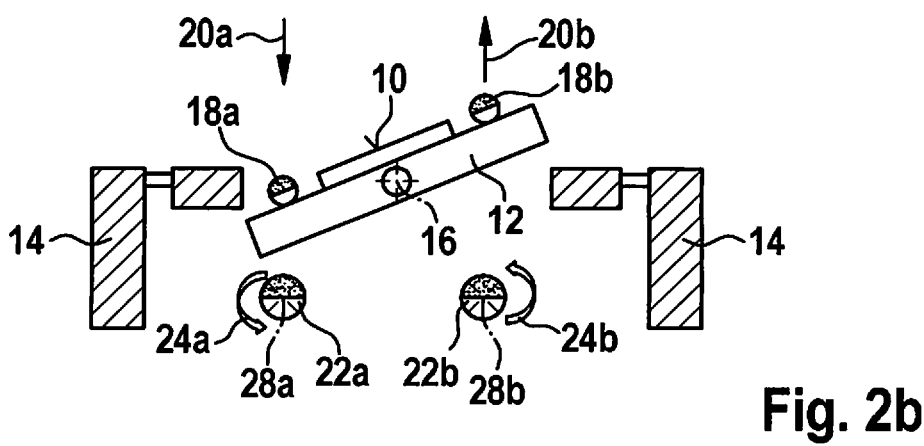

FIGS. 2a and 2b show a second specific embodiment and a third specific embodiment of the mechanical component, respectively.

The mechanical components shown schematically in FIGS. 2a and 2b differ from the previously described specific embodiment only in that external permanent magnets 22a and 22b are able to be set or are set into rotations about a predefined axis of rotation 28a or 28b as their respective excitation motion 24a or 24b. Preferably, axes of rotation 28a and 28b of all external permanent magnets 22a and 22b are aligned in parallel with one another. In addition, all external permanent magnets 22a and 22b are able to be set or may be set into rotations about respective allocated axis of rotation 28a or 28b at the same rotational frequency.

In the specific embodiments of FIGS. 2a and 2b, the first half of external permanent magnets 22a is rotated about the respective axis of rotation 28a or 28b in phase opposition/phase-shifted by 180° in comparison with the second half of external permanent magnets 22b. This, too, allows the first half of external permanent magnets 22a and the second half of external permanent magnets 22b to attract or repel the respectively allocated half of permanent-magnetic elements 18a or 18b in phase opposition/phase-shifted by 180°.

For example, the magnetic actuator device may include at least one motor by which external permanent magnets 22a and 22b are able to be set/are set into excitation motions 24a or 24b that rotate about their respective predefined axis of rotation 28a or 28b. A comparison of FIGS. 2a and 2b shows that a placement of external permanent magnets 22a and 22b on a side of adjustable part 12 fitted with permanent-magnetic elements 18a and 18b (FIG. 2a), and a placement of external permanent magnets 22a and 22b on a side of adjustable part 12 that is pointing away from permanent-magnetic elements 18a and 18b (FIG. 2b) is possible.

Figure 3A:
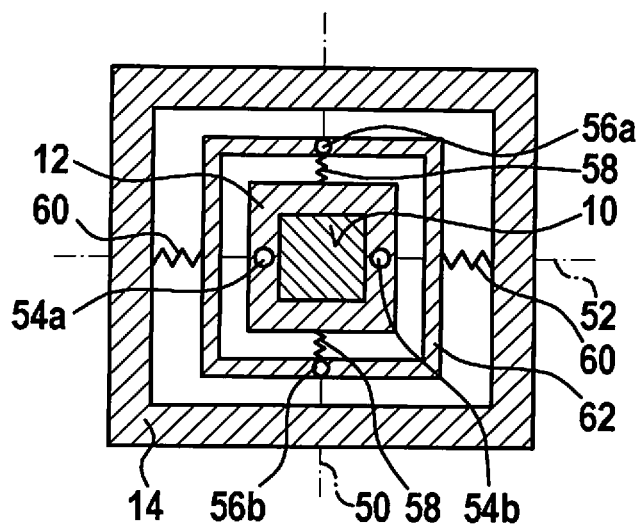
FIG. 3a-3c show schematic partial illustrations of fourth through sixth specific embodiments of the mechanical component.
Figure 3B:
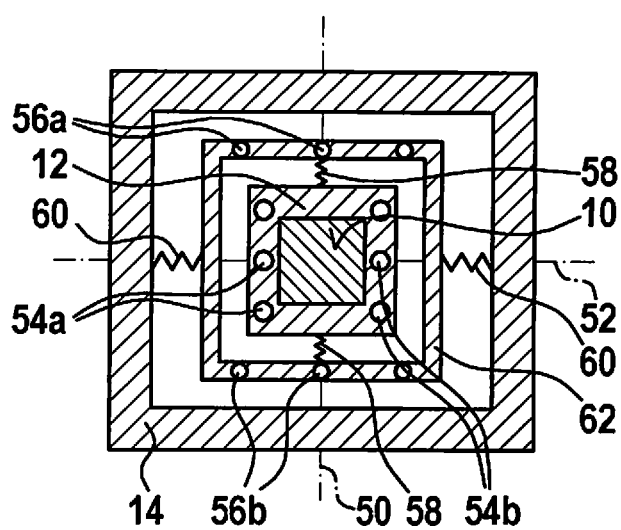
Figure 3C:
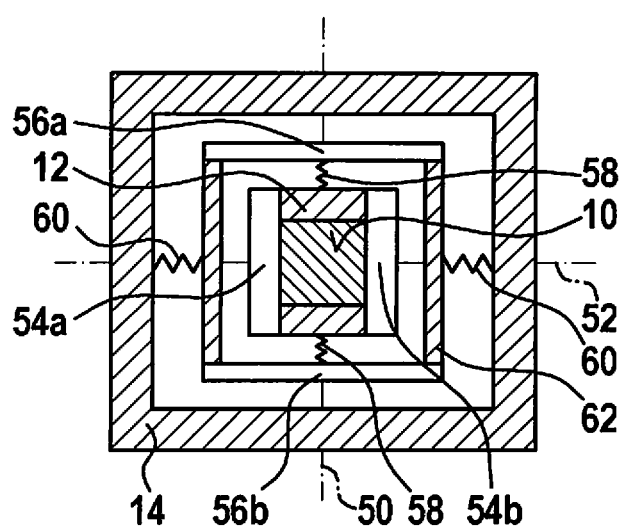

FIGS. 3a through 3c show schematic partial illustrations of fourth through sixth specific embodiments of the mechanical component.

All of the schematically shown mechanical components in FIGS. 3a through 3c have in common that the respective adjustable part 12 is able to be adjusted in relation to its support 14 both about a first axis of rotation 50 and about a second axis of rotation 52 that is aligned at an incline to first axis of rotation 50. In particular, first axis of rotation 50 and second axis of rotation 52 may be aligned at a right angle to each other.

In all mechanical components schematically shown in FIGS. 3a through 3c, the adjustment of adjustable part 12 about axes of rotation 50 and 52 takes place with the aid of the magnetic actuator device of the mechanical component. Each actuator device includes at least one first permanent-magnetic element 54a and 54b, at least one second permanent-magnetic element 56a and 56b, at least one first external permanent magnet and at least one second external permanent magnet in each case. (The external permanent magnets are not depicted in FIGS. 3a through 3c.) In addition, the respective actuator device is designed to set the at least one first external permanent magnet into a first excitation motion in such a way that the at least one first permanent-magnetic element 54a and 54b is able to be set into a first adjustment motion with the aid of a first magnetic field that is induced by the at least one first external permanent magnet and varies over time on account of the respective first excitation motion of the at least one first external permanent magnet. In this way, adjustable part 12 is able to be set into the first co-adjustment motion about first axis of rotation 50 with the aid of the at least one first permanent-magnetic element 54a and 54b set into the respective first adjustment motion. In addition, the magnetic actuator device is also designed to set the at least one second external permanent magnet into a second excitation motion, in such a way that the at least one second permanent-magnetic element 56a and 56b is able to be set into a second adjustment motion with the aid of a second magnetic field that is induced by the at least one second external permanent magnet and varies over time on account of the respective second excitation motion of the at least one second external permanent magnet. Thus, adjustable part 12, which is directly or indirectly connected to the at least one second permanent-magnetic element 56a and 56b, is also able to be set into a second co-adjustment motion about second axis of rotation 52, with the aid of the at least one second permanent-magnetic element 56a and 56b set into the respective second adjustment motion. The mechanisms shown as images in FIGS. 1, 2a and 2b may be used for setting the external permanent magnets into their excitation motions. For example, using the magnetic actuator device, the first external permanent magnets may be moved laterally and the second external permanent magnets may be rotated, or the first external permanent magnets may be rotated and the second external permanent magnets may be moved laterally.

In all mechanical components shown in FIGS. 3a through 3c, adjustable part 12 is suspended on support 14 at least with the aid of at least one inner spring 58 and at least one outer spring 60; this is done in such a way that adjustable part 12 is adjustable in relation to support 14 about first axis of rotation 50 under deformation of at least the at least one inner spring 58. At the same time, adjustable part 12 is adjustable about second axis of rotation 52 under deformation of at least the at least one outer spring 60. For example, adjustable part 12 may be connected via the at least one inner spring 58 to an intermediate frame 62, which is connected to support 14 via the at least one outer spring 60. In particular, adjustable part 12 may be suspended on intermediate frame 62 between two inner springs 58 that extend along first axis of rotation 50. Accordingly, a suspension of intermediate frame 62 on support 14 between two outer springs 60 that extend along second axis of rotation 52 is possible as well.

In the specific embodiments of FIGS. 3a through 3c, the magnetic actuator device is preferably designed to adjust adjustable part 12 in a resonant manner in relation to support 14 under deformation of at least the at least one inner spring 58 about first axis of rotation 50. At the same time, the magnetic actuator device is designed to adjust adjustable part 12 in a quasi-static manner about second axis of rotation 52 under deformation of at least the at least one outer spring 60.

The mechanical components of FIGS. 3a through 3c may therefore be used for many different purposes, e.g., in projectors or scanners. In particular, a gesture control is able to be projected into space using any of the specific embodiments of FIGS. 3a through 3c.

All specific embodiments of FIGS. 3a through 3c have an even number of first permanent-magnetic elements 54a and 54b, and an even number of second permanent-magnetic elements 56a and 56b. In addition, in all specific embodiments of FIGS. 3a through 3c, a first half of the first permanent-magnetic elements 54a is situated on a first side of first axis of rotation 50. A second half of first permanent-magnetic elements 54b is situated on a second side of first axis of rotation 50, and a first half of second permanent-magnetic elements 56a is situated on a first side of second axis of rotation 52, and a second half of second permanent-magnetic elements 56b is situated on a second side of second axis of rotation 52. (A number of the first permanent-magnetic elements 54a on the first side of first axis of rotation 50 is therefore equal to a number of the first permanent-magnetic elements 54b on the second side of first axis of rotation 50, and a number of the second permanent-magnetic elements 56a on the first side of second axis of rotation 52 is equal to a number of the second permanent-magnetic elements 56b on the second side of second axis of rotation 52.) In addition, each one of the specific embodiments may also have an even number of first external permanent magnets and an even number of second external permanent magnets. Here, a first half of the first external permanent magnets (number of the first external permanent magnets divided by 2) may be allocated to the first half of first permanent-magnetic elements 54a, and a second half of the first external permanent magnets (number of the first external permanent magnets divided by 2) may be allocated to the second half of the first permanent-magnetic elements 54b. A first half of the second external permanent magnetic magnets (number of the second external permanent magnets divided by 2) may be allocated to the first half of the second permanent-magnetic elements 56a, and a second half of the second external permanent magnets (number of second external permanent magnets divided by 2) may be allocated to the second half of the second permanent-magnetic elements 56b.

Such an even/symmetrical distribution of first permanent-magnetic elements 54a and 54b and the first external permanent magnets with respect to first axis of rotation 50, and of the second permanent-magnetic elements 56a and 56b and the second external permanent magnets with respect to second axis of rotation 52 makes it possible to transmit relatively high forces to adjustable part 12 for its simultaneous adjustment/deflection about both axes of rotation 50 and 52. In addition, uniform speeds for the co-adjustment motions of adjustable part 12 about both axes of rotation 50 and 25 are achievable. This also makes it possible to compensate for the increasing spring forces of springs 58 and 60 that become greater with increasing deflections of adjustable part 12 from its initial position.

All afore-described mechanical components may be developed in a single chip (as a single-chip solution). It is recognizable in all of the afore-described specific embodiments that no electrical connection/line across a spring 58 or 60 is required. Conventional restrictions in an adjustability of adjustable part 12, which are attributable to an electrical connection/line routed across at least one spring 58 and 60, thus do not have to be tolerated in the afore-described mechanical components. The absence of electrical connections/lines also reduces the production costs for the production of the mechanical components described above. In addition, the mechanical components feature low thermal loading because there is no longer any current flow through an electrical connection/line.

In all afore-described mechanical components, excitation motions 24a and 24b of external permanent magnets 22a and 22b induce an attraction or repelling of the at least one allocated permanent-magnetic element 18a, 18b, 54a, 54b, 56a or 56b on the side of allocated axis of rotation 16, 50 or 52, as a result of which an excitation of adjustable part 12 for the desired rotary motion about allocated axis of rotation 16, 50 or 52 is induced "from outside". In a symmetrical overall structure, external permanent magnets 11a and 22b preferably produce an inverse change in the respective magnetic field on each side of allocated axis of rotation 16, 50 and 52. The adjustment/tilting of adjustable element 12 about respective axis of rotation 16, 50 or 52 brought about in this manner produces an additional spatial approaching or distancing of permanent-magnetic elements 18a, 18b, 54a, 54b, 56a and 56b in relation to permanent magnets 22a or 22b. This results in a steadily growing coupling of the parts moving towards one another and in a steadily weaker coupling of the parts that are moving away from one another.

Preferably, the afore-described mechanical components are macromechanical components such as a macro-mirror. This may be understood as mirror devices whose reflecting surfaces 10 have a surface area of at least 1 mm$^2$ (square millimeter), preferably at least 2 mm², and in particular at least 5mm². As an alternative, the afore-described mechanical components may also be micromechanical components such as micro-mirrors.

Figure 4:
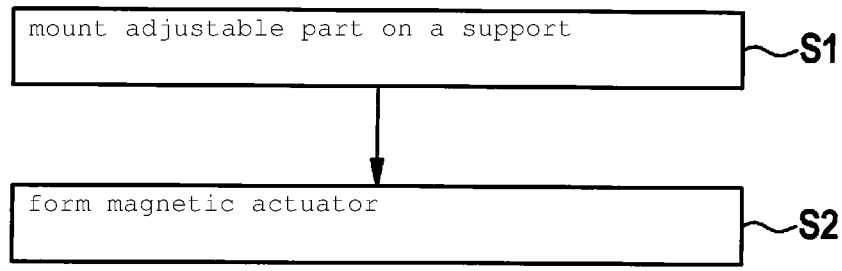
FIG. 4 shows a flow diagram to explain a specific embodiment of the production method for a mechanical component.

FIG. 4 shows a flow diagram to elucidate a specific embodiment of the production method for a mechanical component.

The production method described in the following text may be executed to produce one of the afore-described mechanical components, for instance. However, it should be noted that an executability of the production method described in the following text is not restricted to a production of such a mechanical component.

In a method step S1 of the production method, an adjustable part of the subsequent mechanical component is mounted on a support such that the adjustable part is able to be adjusted in relation to the support about at least one (first) axis of rotation. The adjustable part, for instance together with at least one spring and the support, may be structured out of a semiconductor substrate. One example for the connection of the adjustable part to the support via the at least one spring was already described earlier.

In a method step S2 of the production method, a magnetic actuator device is formed which includes at least one (first) permanent-magnetic element. The at least one (first) permanent-magnetic element is directly or indirectly connected to the adjustable part in such a way that during an operation of the mechanical component, the at least one (first) permanent-magnetic element is set into a (first) adjustment motion with the aid of a (first) magnetic field that is induced by the magnetic actuator device and varies over time, and such that the adjustable part is set into a (first) co-adjustment motion about the (first) axis of rotation with the aid of the at least one (first) permanent-magnetic element set into the respective (first) adjustment motion. In addition, the magnetic actuator device is developed with at least one (first) external permanent magnet, which induces the (first) magnetic field. The magnetic actuator device is additionally designed to set the at least one (first) external permanent magnet into a (first) excitation motion during the operation of the mechanical component, in such a way that the at least one (first) permanent-magnetic element is set into the (first) adjustment motion with the aid of the (first) magnetic field that varies over time on account of the respective (first) excitation motion of the at least one (first) external permanent magnet.

As an optional further refinement, in method step S2, the magnetic actuator device may also be developed with at least one second permanent-magnetic element and with at least one second external permanent magnet. In this case, the magnetic actuator device may additionally be designed to set the at least one second external permanent magnet into a second excitation motion during the operation of the mechanical component, such that the at least one second permanent-magnetic element is set into a second adjustment motion with the aid of a second magnetic field that is induced by the at least one second external permanent magnet and that varies over time on account of the respective second excitation motion of the at least one second external permanent magnet. In addition, the adjustable part is connected, directly or indirectly, to the at least one second permanent-magnetic element such that during the operation of the mechanical component, the adjustable part is set into a second co-adjustment motion about a second axis of rotation that is aligned at an incline to the first axis of rotation, this being achieved with the aid of the at least one second permanent-magnetic element set into the respective second adjustment motion.

An affixation of the at least one permanent-magnetic element may be implemented by bonding or clamping, among other things. A magnetization of a plurality of permanent-magnetic elements is preferably identical on the same side of the allocated axis of rotation. However, it is also possible that permanent-magnetic elements of a different magnetization are situated on the same side of the allocated axis of rotation. In addition, a retroactive magnetization of the at least one permanent-magnetic element is possible as well.

Method steps S1 and S2 are able to be carried out in a random sequence or in a temporally overlapping manner. In particular, the finished mechanical component may be produced as a single-chip solution using a very simple MEMS process. A wafer stack is not required in order to produce the mechanical component. The mechanical component may subsequently be fastened to any substrate as a purely passive chip using soldering, bonding or some other manner. For instance, screw-type and/or plug-in connections are also options for the fastening.

Since the produced mechanical component requires no electrical connections/lines, in particular no electrical connection/line routed across a spring, the production method is relatively economical. In addition, the absence of electrical connections/lines may be utilized for simplifying or omitting bonding or soldering processes. Furthermore, a relatively large material selection is ensured inasmuch as barely any conductive materials are required, in particular not for the spring configuration.

Figure 5:
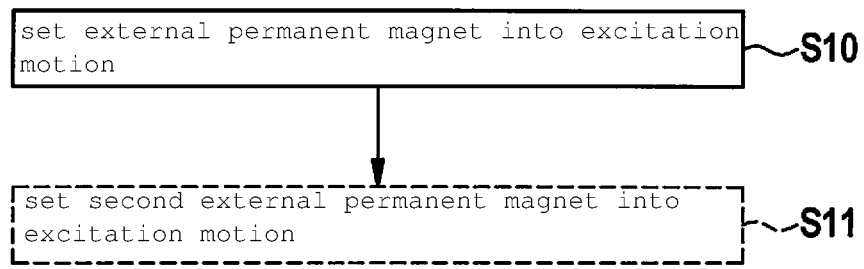
FIG. 5 shows a flow diagram to explain a specific embodiment of the method for adjusting an adjustable part at least about a first axis of rotation in relation to its support.

FIG. 5 shows a flow diagram to elucidate a specific embodiment of the method for adjusting an adjustable part at least about a first axis of rotation in relation to its support.

The method described here includes at least a method step S10: In method step S10, at least one (first) external permanent magnet, which induces a (first) magnetic field, is set into a (first) excitation motion in such a way that the (first) magnetic field varies over time at at least one (first) permanent-magnetic element which is directly or indirectly connected to the adjustable part, and the at least one (first) permanent-magnetic element is set into a (first) adjustment motion such that the adjustable part is set into a (first) co-adjustment motion in relation to the support about the (first) axis of rotation, with the aid of the at least one (first) permanent-magnetic element set into the respective (first) adjustment motion.

Optionally, it is also possible to execute a method step S11. To do so, at least one second external permanent magnet, which induces a second magnetic field, is set into a second excitation motion such that the second magnetic field varies over time at at least one second permanent-magnetic element which is directly or indirectly connected to the adjustable part, and the at least one second permanent-magnetic element is set into a second adjustment motion in such a way that the adjustable part is set into a second co-adjustment motion in relation to the support about a second axis of rotation aligned at an incline to the first axis of rotation, with the aid of the at least one second permanent-magnetic element set into the respective second adjustment motion.

What is claimed is:

1. A mechanical component, comprising:
   a support;
   an adjustable part which is situated on the support in such a way that the adjustable part is adjustable in relation to the support about at least one first axis of rotation; and
   a magnetic actuator device having at least one first permanent-magnetic element, which is able to be set into a respective first adjustment motion by a first magnetic field which is induced with the aid of the magnetic actuator device and varies over time, and which is directly or indirectly connected to the adjustable part in such a way that the adjustable part is able to be set into a first co-adjustment motion about the first axis of rotation with the aid of the at least one first permanent-magnetic element set into the respective first adjustment motion;

wherein the magnetic actuator device includes at least one first external permanent magnet which induces the first magnetic field, and the magnetic actuator device is additionally designed to set the at least one first external permanent magnet into a first excitation motion in such a way that the at least one first permanent-magnetic element is able to be set into the first adjustment motion with the aid of the first magnetic field which varies over time on account of the respective first excitation motion of the at least one first external permanent magnet.

2. The mechanical component as recited in claim 1, wherein the magnetic actuator device includes at least one second permanent-magnetic element and at least one second external permanent magnet, and is additionally designed to set the at least one second external permanent magnet into a second excitation motion in such a way that the at least one second permanent-magnetic element is able to be set into a second adjustment motion with the aid of a second magnetic field that is induced by the at least one second external permanent magnet and varies over time on account of the respective second excitation motion of the at least one second external permanent magnet; and wherein the adjustable part is directly or indirectly connected to the at least one second permanent-magnetic element in such a way that the adjustable part is able to be set into a second co-adjustment motion about a second axis of rotation aligned at an incline to the first axis of rotation, with the aid of the at least one second permanent-magnetic element set into the respective second adjustment motion.

3. The mechanical component as recited in claim 2, wherein the adjustable part is suspended on the support with the aid of at least one inner spring and at least one outer spring in such a way that the adjustable part is adjustable in relation to the support about the first axis of rotation under deformation of at least the at least one inner spring, and simultaneously, is adjustable about the second axis of rotation under deformation of at least the at least one outer spring.

4. The mechanical component as recited in claim 3, wherein the magnetic actuator device is designed to resonantly adjust the adjustable part in relation to the support under deformation of at least the at least one inner spring, and simultaneously, to adjust it in a quasi-static manner about the second axis of rotation under deformation of at least the at least one outer spring.

5. The mechanical component as recited in claim 1, wherein the magnetic actuator device includes at least one piezo by which at least one of: (i) the at least one first external permanent magnet, and (ii) the at least one second external permanent magnet is able to be set into the respective first or second excitation motion aligned along its respective predefined adjustment axis.

6. The mechanical component as recited in claim 1, wherein the magnetic actuator device includes at least one motor, by which at least one of: (i) the at least one first external permanent magnet, and (ii) the at least one second external permanent magnet is able to be set into the respective first or second excitation motion aligned along its respective predefined adjustment axis or rotating about its respective predefined axis of rotation.

7. The mechanical component as recited in claim 1, wherein the mechanical component is at least one of: (i) a micromechanical component, and (ii) a micro-mirror.

8. The mechanical component as recited in claim 1, wherein the mechanical component is at least one of: (i) a macromechanical component, and (ii) a macro-mirror.

9. A method for producing a mechanical component, comprising:
mounting an adjustable part on a support in such a way that the adjustable part is adjustable in relation to the support about at least a first axis of rotation; and
developing a magnetic actuator device having at least one first permanent-magnetic element, which is directly or indirectly connected to the adjustable part in such a way that during an operation of the mechanical component, the at least one first permanent-magnetic element is set into a respective first adjustment motion with the aid of a first magnetic field that is induced by the magnetic actuator device and varies over time, and the adjustable part is set into a first co-adjustment motion about the first axis of rotation with the aid of the at least one first permanent-magnetic element set into the respective first adjustment motion;
wherein the magnetic actuator device is developed with at least one first external permanent magnet which induces the first magnetic field, and the magnetic actuator device is additionally designed to set the at least one first external permanent magnet into a first excitation motion during the operation of the mechanical component such that the at least one first permanent-magnetic element is set into the first adjustment motion with the aid of the first magnetic field which varies over time on account of the respective first excitation motion of the at least one first external permanent magnet.

10. The production method as recited in claim 9, wherein the magnetic actuator device includes at least one second permanent-magnetic element and with at least one second external permanent magnet and it is additionally designed to set the at least one second external permanent magnet into a second excitation motion during operation of the mechanical component such that the at least one second permanent-magnetic element is set into a second adjustment motion with the aid of a second magnetic field which is induced by the at least one second external permanent magnet and varies over time on account of the respective second excitation motion of the at least one second external permanent magnet, the adjustable part being directly or indirectly connected to the at least one second permanent-magnetic element such that the adjustable part is set into a second co-adjustment motion about a second axis of rotation aligned at an incline to the first axis of rotation during the operation of the mechanical component, with the aid of the at least one second permanent-magnetic element set into the respective second adjustment motion.

11. A method for adjusting an adjustable part at least about a first axis of rotation in relation to its support, comprising:
setting at least one first external permanent magnet, which induces a first magnetic field, into a first excitation motion such that the first magnetic field varies over time at at least one first permanent-magnetic element which is directly or indirectly connected to the adjustable part, and the at least one first permanent-magnetic element is set into a first adjustment motion such that the adjustable part is set into a first co-adjustment motion in relation to the support about the first axis of rotation with the aid of the at least one first permanent-magnetic element set into the respective first adjustment motion.

12. The method as recited in claim 11, further comprising: setting at least one second external permanent magnet, which induces a second magnetic field, into a second excitation motion such that the second magnetic field varies over time at at least one second permanent-magnetic element that is directly or indirectly connected to the adjustable part, and the at least one second permanent-magnetic element is set into a second adjustment motion such that the adjustable part is set into a second co-adjustment motion in relation to the support, about a second axis of rotation aligned at an incline to the first axis of rotation with the aid of the at least one second permanent-magnetic element set into the respective second adjustment motion.

* * * * *